United States Patent
Cooperman et al.

(10) Patent No.: US 7,212,618 B1
(45) Date of Patent: May 1, 2007

(54) SYSTEMS AND METHODS FOR FORWARDING TELEPHONE CALLS

(75) Inventors: Michael Cooperman, Framingham, MA (US); Albert M. Forcucci, Roslindale, MA (US)

(73) Assignee: Verizon Laboratories Inc., Waltham, MA (US)

( * ) Notice: Subject to any disclaimer, the term of this patent is extended or adjusted under 35 U.S.C. 154(b) by 899 days.

(21) Appl. No.: 10/008,000

(22) Filed: Nov. 13, 2001

(51) Int. Cl.
*H04M 1/56* (2006.01)
*H04M 3/42* (2006.01)
*H04M 1/64* (2006.01)

(52) U.S. Cl. .................. 379/142.05; 379/142.06; 379/142.07; 379/211.02; 379/70

(58) Field of Classification Search .......... 379/142.05, 379/142.12, 142.06, 142.07, 142.11, 142.13, 379/88.19, 88.02, 211.02, 210.02, 214.01, 379/67.1, 70
See application file for complete search history.

(56) References Cited

U.S. PATENT DOCUMENTS

| | | | | |
|---|---|---|---|---|
| 4,677,659 A * | 6/1987 | Dargan | ................ | 379/93.27 |
| 5,651,055 A * | 7/1997 | Argade | ................ | 379/88.01 |
| 5,909,647 A * | 6/1999 | Hashimoto et al. | ...... | 455/412.2 |
| 5,930,700 A * | 7/1999 | Pepper et al. | ............ | 455/435.3 |
| 6,163,596 A * | 12/2000 | Gelfer et al. | ............ | 379/67.1 |
| 6,711,239 B1 * | 3/2004 | Borland | ................ | 379/67.1 |
| 6,771,756 B1 * | 8/2004 | Chou et al. | ............ | 379/201.01 |

* cited by examiner

*Primary Examiner*—Barry Taylor

(57) ABSTRACT

A system (130) forwards a telephone call to a user. The system (130) receives a telephone call from a calling party and compares the name of the calling party to a list of names. If the calling party's name matches a name in the list, the system (130) forwards the telephone call to the user.

23 Claims, 4 Drawing Sheets

SYSTEMS AND METHODS FOR FORWARDING TELEPHONE CALLS

FIELD OF THE INVENTION

The present invention relates generally to communication systems and, more particularly, to systems and methods for forwarding telephone calls.

BACKGROUND OF THE INVENTION

Currently, when a call arrives at a user's telephone, the telephone always rings. The user determines whether to answer the telephone call by using caller ID or listening to a message left by the calling party on the user's answering machine. Caller ID does not always identify the calling party, however. Therefore, the user may have to listen to the message to determine the identity of the calling party. When the user is expecting a telephone call, the user may have to listen to many messages before answering the expected call.

Accordingly, there is a need in the art for systems and methods that forwards calls only when an expected call is detected.

SUMMARY OF THE INVENTION

Systems and methods consistent with the present invention address this and other needs by providing a mechanism that forwards expected telephone calls to a user's telephone while forwarding unexpected telephone calls directly to voicemail or an answering machine.

In accordance with the purpose of this invention as embodied and broadly described herein, an answering system for processing telephone calls to one or more user devices includes a first memory device, a second memory device, first logic, and second logic. The first memory device stores a name of a calling party. The second memory device stores a group of predefined names. The first logic compares the name of the calling party to the group of predefined names. The second logic routes an incoming telephone call to a user device when the name of the calling party matches a name in the group of predefined names.

In another implementation consistent with the present invention, a network includes a first device associated with a sending party, a second device associated with a destination party, and an answering system. The answering system receives a message from the first device, prompts the sending party to enter a name of the sending party, transfers the message to the second device when the name of the sending party matches a previously stored name, and stores the message when the name of the sending party fails to match the previously stored name.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings identify the same or similar elements. Also, the following detailed description does not limit the invention. Instead, the scope of the invention is defined by the appended claims and equivalents.

Implementations consistent with the present invention provide a process by which incoming telephone calls may be screened. An answering system compares the name of the calling party to a list of acceptable names. If the calling party's name matches one of the names in the list, the call is put through. Otherwise, the calling party is forwarded to voicemail.

Exemplary System

Figure 1:
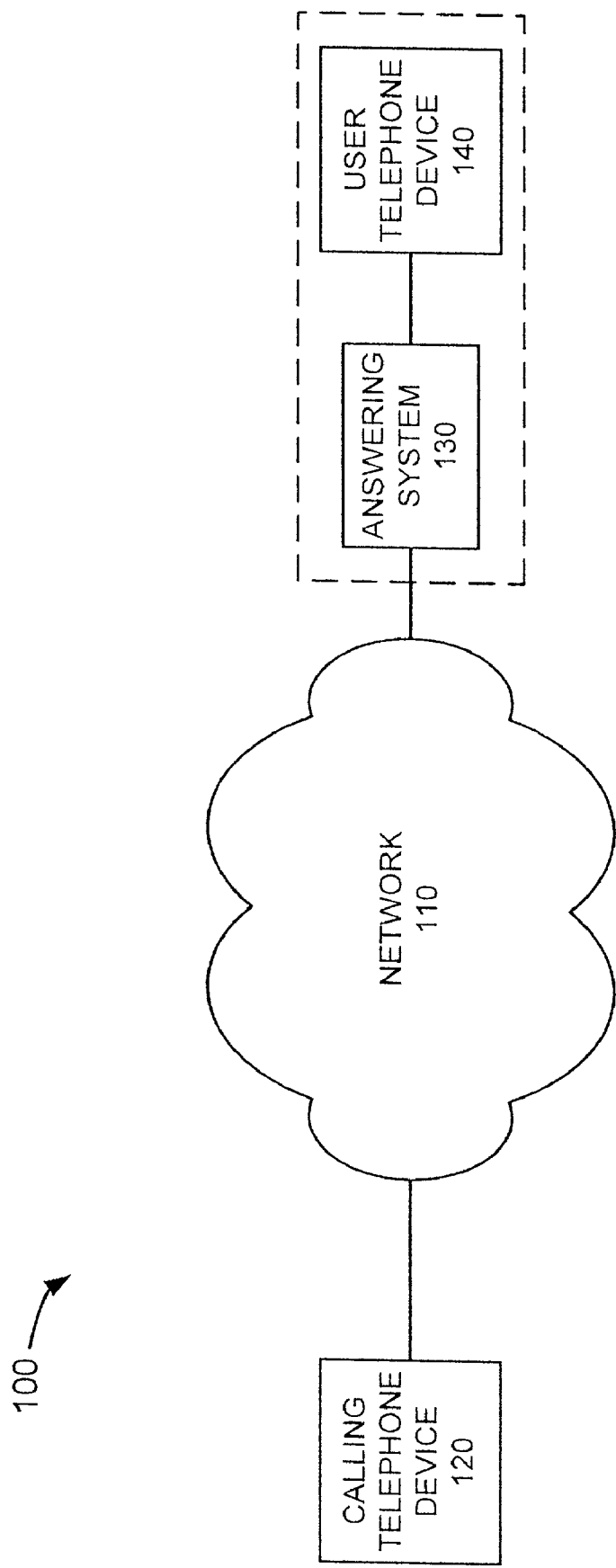
FIG. 1 illustrates an exemplary system in which systems and methods consistent with the present invention may be implemented.

FIG. 1 illustrates an exemplary system 100 in which systems and methods, consistent with the present invention, may be implemented. System 100 includes a network 110, a calling telephone device 120, an answering system 130, and a user telephone device 140. A single calling telephone device 120, answering system 130, and user telephone device 140 have been shown for simplicity. It will be appreciated that the techniques described herein are equally applicable to systems having multiple calling telephone devices 120, answering systems 130, and user telephone devices 140.

The network 110 may include one or more conventional networks, such as a public switched telephone network (PSTN), the Internet, an intranet, a wide area network (WAN), a local area network (LAN), or other similar types of networks, capable of transmitting voice communications. The calling telephone device 120 may include any device that can receive, process, and transmit voice data, such as a plain old telephone system (POTS) telephone, a cellular phone, a personal computer, laptop, personal digital assistant (PDA), or the like.

The user telephone device 140 may include any device that can receive, process, and transmit voice data, such as a POTS telephone, a cellular phone, a personal computer, laptop, personal digital assistant (PDA), or the like. The user telephone device 140 may connect to the answering system 130 via a direct wired, wireless, or optical connection or via a network. The answering system 130 may include logic for determining whether to forward an incoming telephone call to the user telephone device 140. While the answering system 130 and the user telephone device 140 are illustrated in FIG. 1 as separate devices, the answering system 130 and user telephone device 140 may be implemented within the same device, as illustrated by the dotted line.

Figure 2:
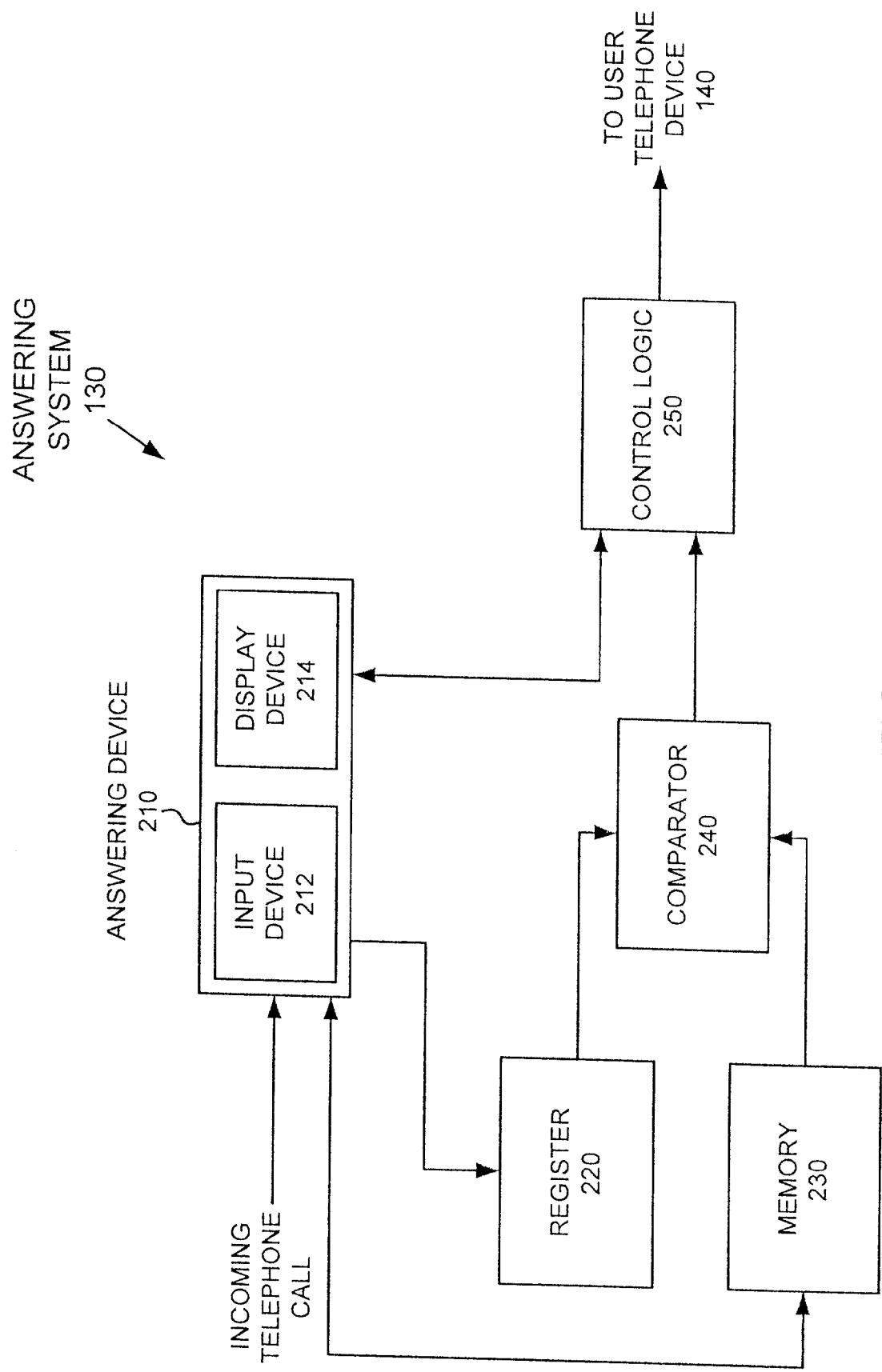
FIG. 2 illustrates an exemplary configuration of the answering system of FIG. 1.

FIG. 2 illustrates an exemplary configuration of the answering system 130 of FIG. 1. As illustrated, the answering system 130 includes an answering device 210, a register 220, a memory 230, a comparator 240, and control logic 250.

The answering device 210 may include one or more devices that receive an incoming telephone call, prompt the calling party to input information, and store voice messages. The answering device 210 may also include one or more voice recognition devices (not shown) that translate information input by the calling party into words.

Additionally, the answering device 210 may include an input device 212 that allows a user to enter telephone call parameters. In one implementation consistent with the present invention, these parameters include the names of people from which telephone calls will be accepted. These parameters may also include dates and times for which telephone calls will be accepted. The answering device 210 may further include a display device 214 that allows the user to verify that the information entered into input device 212 is entered correctly.

The register 220 may include any type of dynamic storage device capable of temporarily storing information input by the calling party. This information may include, for example, a calling party's last name, first name, or other similar types of information for identifying the calling party. The memory 230 may include one or more conventional memory devices for storing the information entered by the user.

Figure 3:
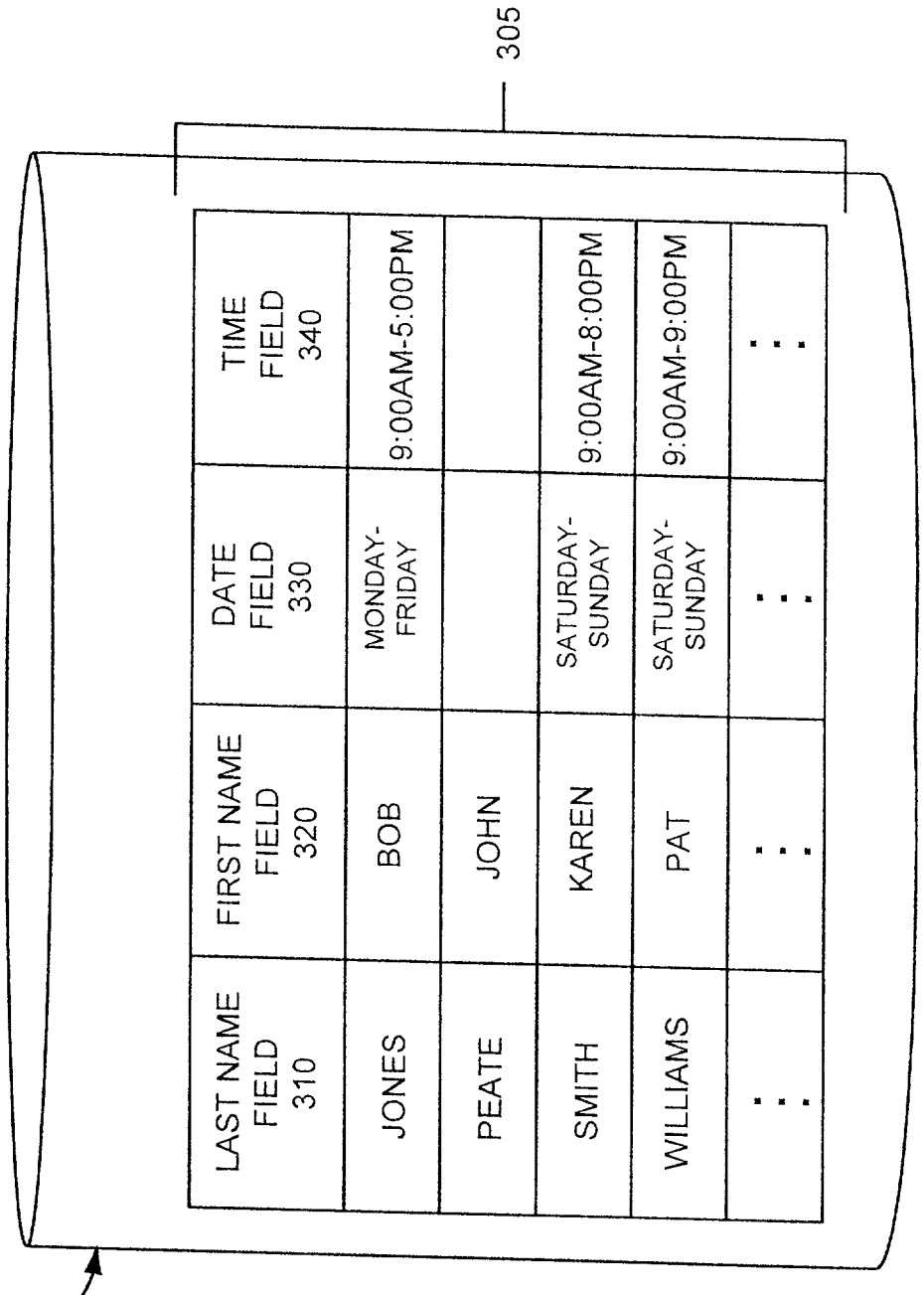
FIG. 3 illustrates an exemplary configuration of the memory of FIG. 2.

FIG. 3 illustrates an exemplary configuration of the memory 230 of FIG. 2. As illustrated, the memory 230 may include a group of entries 305. Each entry 305 includes information stored in one or more of the following exemplary fields: a last name field 310, an optional first name field 320, an optional date field 330, and an optional time field 340. The memory 230 may contain additional fields (not shown) that aid the answering system 130 in identifying a calling party and/or searching/sorting data in the memory 230.

The last name field 310 may store information representing a last name of a potential calling party. The first name field 320 may store information representing a first name of a potential calling party. The date field 330 may store information identifying a date or range of dates. The time field 340 may store information identifying one or more time periods.

Returning to FIG. 2, the comparator 240 may include one or more devices capable of comparing the information in register 220 to the information stored in memory 230 and outputting a signal indicative of the result. The comparator 240 may, for example, compare textual data or voice samples. The control logic 250 may include one or more devices capable of receiving the resultant signal from the comparator 240 and controlling whether the incoming telephone call is routed to the answering device 210 or user telephone device 140.

Exemplary Processing

Figure 4:
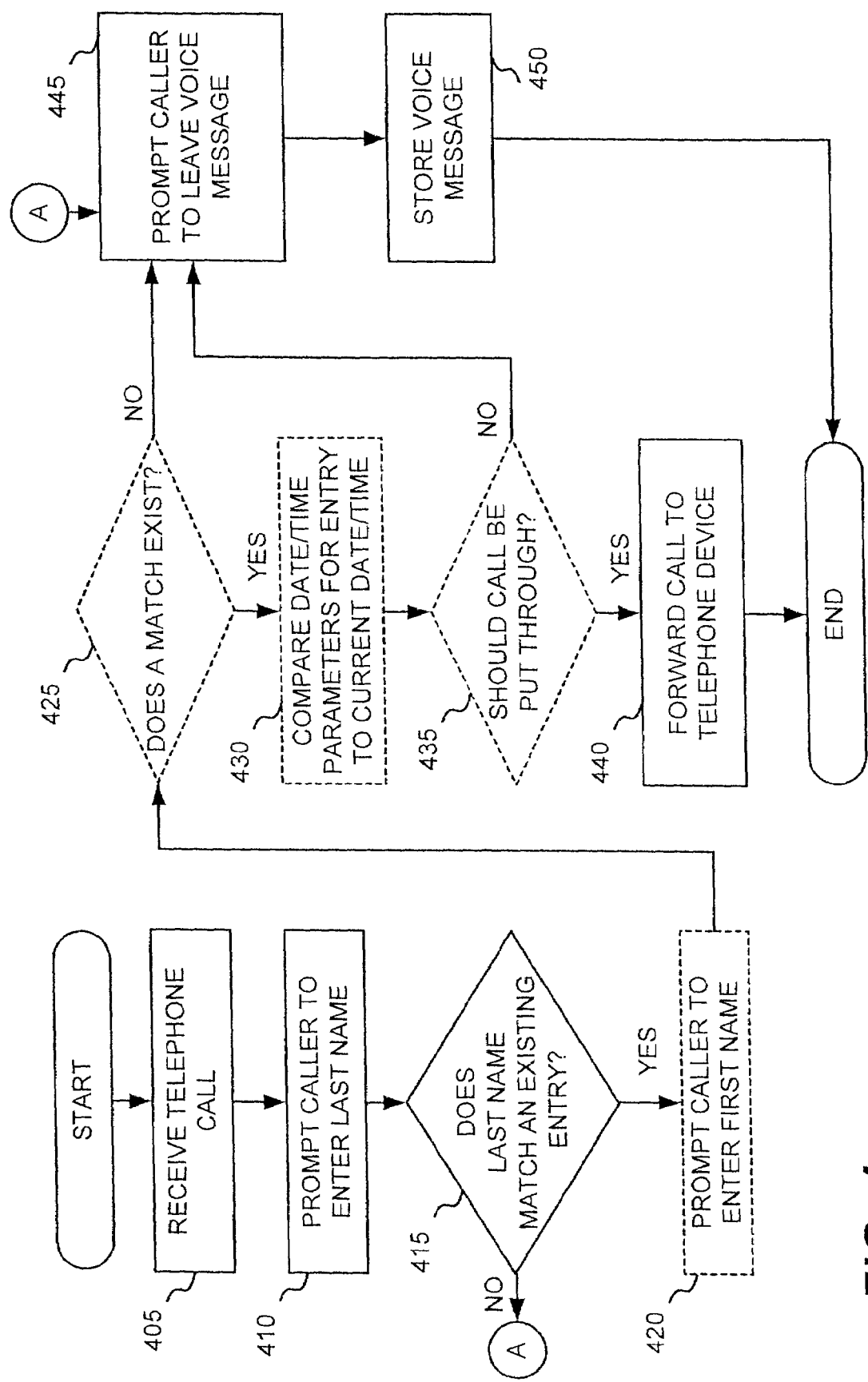
FIG. 4 illustrates an exemplary process for processing incoming telephone calls in an implementation consistent with the present invention.

FIG. 4 illustrates an exemplary process for forwarding incoming telephone calls in an implementation consistent with the present invention. Assume that a user of answering system 130 has stored a group of entries in memory 230, such as the entries 305 illustrated in FIG. 3. In an implementation consistent with the present invention, these entries include names of people from which the user is willing to accept telephone calls.

Processing may begin with the answering system 130 receiving a telephone call from the calling telephone device 120 [act 405]. In response, the answering system 130 may prompt the calling party to enter his/her last name into the calling telephone device 120 [act 410]. The answering system 130 may, for example, prompt the calling party to enter his/her last name via a keypad associated with the calling telephone device 120. Alternatively, the answering system 130 may prompt the calling party to verbally enter his/her last name. In the latter case, the answering system 130 may use voice recognition techniques to interpret the voice response or may store the actual voice sample.

Once the calling party's last name has been entered, the answering system 130 may store the entry into the register 220. The answering system 130 may also verify that the calling party entered the name correctly by providing the calling party with the information stored in register 220. If the calling party indicates that the name was incorrectly entered, the answering system 130 may prompt the calling party to enter the information again.

The answering system 130 may determine whether the last name in register 220 matches an existing entry of the memory 230 [act 415]. To make such a determination, the comparator 240 may compare the entry in the register 220 to each entry in the last name field 310 of the memory 230. In an implementation consistent with the present invention, a comparison of the first two or three letters of the name in the register 220 and the names in the memory 230 may be enough to determine whether a match exists.

If the calling party's last name matches an entry of the memory 230, the answering system 130 may optionally provide additional screening by prompting the calling party to enter a first name [act 420]. The answering system 130 may store the entered information into register 220. The answering system 130 may then determine if the first name in register 220 matches the first name corresponding to the matching last name entry of memory 230. For example, if the calling party entered the last name "Jones" and the first name "Bob," the answering system 130 compares the entered first name to the name stored in memory 230.

If the calling party's first name matches the corresponding entry of memory 230 [act 420], the answering system 130 may optionally compare a current date/time to the values in the corresponding date and time fields 330 and 340 of memory 230 for that entry [act 435]. For the example above, if the calling party had entered "Jones" and "Bob," the answering system 130 may determine whether a current date is within the range "Monday–Friday" and whether the current time is within the range "9 a.m. to 5 p.m." If the current date/time falls within the date and time ranges of the entry's date and time fields 330 and 340, respectively, or if the date and time fields are empty, the answering system 130 may determine that the telephone call should be forwarded to the user's telephone device 140 [act 435]. In such an event, the answering system 130 forwards the telephone call to the user telephone device 140 [act 440]. The user telephone device 140 may notify the user of the presence of the call in a conventional manner.

If the current date/time do not fall within the date and time ranges of the entry's date and time fields 330 and 340 or if the calling party's last name (or first name when a matching last name has been determined) does not match an entry of the memory 230, the answering system 130 prompts the calling party to leave a voice message [act 445]. The answering system 130 may then store the voice message for later retrieval by the user [act 450].

CONCLUSION

Systems and methods, consistent with the present invention, provide an answering system that allows a person to screen telephone calls. By putting through a telephone call only when the name of the calling party matches one of the names on a list of acceptable names, a person can avoid being disturbed by unwanted (or unexpected) telephone calls.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above implementations indicated that the last name of the calling party be obtained by prompting the calling for such information, implementations consistent with the present are not so limited. For example, the present invention is equally applicable to a system that determines the name of a calling party via caller ID.

Moreover, while the answering system 130 is shown connected directly to the user telephone device 140, implementations consistent with the present invention are equally applicable to the answering system 130 and user telephone device 140 being remotely located. For example, the answering system 130 may be located in a central office.

When multiple users are associated with the answering system 130, the memory 230 may store a group of accepted names for each user. When a match occurs, the answering system 130 can direct the incoming telephone call to the particular user with which the matching entry is associated.

It will be appreciated that the present invention can be implemented in hardware, software, or a combination of hardware and software. Thus, the present invention is not limited to any specific combination of hardware circuitry and software.

While a series of acts has been described with regard to FIG. 4, the order of the acts may be varied in other implementations consistent with the present invention. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for forwarding a telephone call to a user, comprising:
   receiving a telephone call from a calling party;
   prompting the calling party during the telephone call to enter his/her name to obtain an entered name of the calling party during the telephone call;
   storing the entered name to obtain a stored entered name;
   providing the calling party with the stored entered name to permit the calling party to verify that the stored entered name is correct;
   comparing the stored entered name of the calling party to a list of names; and
   forwarding the telephone call to the user when the stored entered name of the calling party matches a name in the list.

2. The method of claim 1 further comprising:
   prompting the calling party to leave a voice message when the stored entered name of the calling party fails to match a name in the list; and
   storing the voice message.

3. The method of claim 1 wherein the forwarding the telephone call to the user includes:
   notifying the user of a presence of the telephone call.

4. The method of claim 1 wherein the prompting includes:
   prompting the calling party to enter a last name of the calling party.

5. The method of claim 4 wherein the prompting further includes:
   prompting the calling party to enter a first name of the calling party.

6. The method of claim 1 wherein the prompting includes:
   prompting the calling party to enter the calling party's name via a keypad.

7. The method of claim 1 wherein the prompting includes:
   prompting the calling party to enter the calling party's name verbally.

8. The method of claim 1 wherein the comparing includes:
   comparing a portion of the stored entered name of the calling party to a portion of the names in the list.

9. The method of claim 1 wherein each name in the list is associated with at least one date parameter, and
   wherein the method further comprises:
   detecting a current date;
   determining, when the stored entered name of the calling party matches a name in the list, whether the current date matches the date parameter associated with the matching name in the list; and
   forwarding the telephone call to the user when the current date matches the date parameter.

10. The method of claim 1 wherein each name in the list is associated with at least one time range parameter, and
    wherein the method further comprises:
    detecting a current time;
    determining, when the stored entered name of the calling party matches a name in the list, whether the current time falls within the time range parameter associated with the matching name in the list; and
    forwarding the telephone call to the user when the current time falls within the time range parameter.

11. The method of claim 1 further comprising:
    determining the stored entered name of the calling party using caller ID.

12. A system for forwarding telephone calls to a user, comprising:
    means for receiving a telephone call from a calling party;
    means for prompting the calling party during the telephone call to enter his/her name to obtain an entered name of the calling party during the telephone call;
    means for storing the entered name to obtain a stored entered name;
    means for providing the calling party with the stored entered name to permit the calling party to verify that the stored entered name is correct;
    means for providing a predetermined list of names;
    means for determining whether the stored entered name of the calling party matches a name in the predetermined list of names; and
    means for forwarding the telephone call to the user when the stored entered name of the calling party matches a name in the predetermined list.

13. An answering system for processing telephone calls to one or more user devices, comprising:
    an answering device for receiving and answering an incoming telephone call from a calling party;
    the answering device configured to prompt the calling party during the telephone call to enter his/her name to obtain an entered name of the calling party during the telephone call;
    a first memory device configured to store the entered name of the calling party;

the answering device further configured to provide the calling party with the stored entered name to permit the calling party to verify that the stored entered name is correct;

a second memory device configured to store a group of predefined names;

first logic configured to compare the stored entered name of the calling party to the group of predefined names; and second logic configured to route the incoming telephone call to a user when the stored entered name of the calling party matches a name in the group of predefined names.

14. The answering system of claim 13 further comprising:
the answering device further configured to:
prompt the calling party to leave a voice message when the stored entered name of the calling party fails to match a name in the group of predefined names, and store the voice message.

15. The answering system of claim 13 wherein, when prompting the calling party, the answering device is configured to:
prompt the calling party to enter a last name.

16. The answering system of claim 15 wherein the answering device is further configured to:
prompt the calling party to enter a first name.

17. The answering system of claim 13 wherein, when prompting the calling party, the answering device is configured to:
prompt the calling party to enter the name via a keypad.

18. The answering system of claim 13 wherein, when prompting the calling party, the answering device is configured to:
prompt the calling party to enter the name verbally.

19. The answering system of claim 13 wherein, when comparing, the first logic is configured to:
compare a portion of the stored entered name of the calling party to a portion of the names in the group of predefined names.

20. The answering system of claim 13 further comprising:
third logic configured to:
identify, when the stored entered name of the calling party matches a name in the group of predefined names, a user associated with the matching name, and forward the telephone call to a device associated with the identified user.

21. The answering system of claim 13 further comprising:
logic for determining the name of the calling party using caller ID.

22. A computer readable code encoded on a computer readable medium, the code being executed on one or more processors to perform a method for routing telephone calls to a user device, the computer readable code comprising:
computer readable code for receiving a telephone call from a calling party;
computer readable code for prompting the calling party during the telephone call to enter his/her name to obtain an entered name of the calling party during the telephone call;
computer readable code for storing the entered name to obtain a stored entered name;
computer readable code for providing the calling party with the stored entered name to permit the calling party to verify that the stored entered name is correct;
computer readable code for comparing a name of the calling party to a stored list of names; and
computer readable code for transferring the telephone call to the user when the stored entered name of the calling party matches a name in the stored list.

23. In a network that includes a first device associated with a sending party and a second device associated with a destination party, a method comprising:
receiving a message from the first device,
prompting the sending party during the message receiving to enter a name of the sending party to obtain an entered name during the message receiving,
storing the entered name to obtain a stored entered name;
providing the sending party with the stored entered name to permit the sending party to verify that the stored entered name is correct;
transferring the message to the second device when the stored entered name of the sending party matches a previously stored name, and
storing the message when the stored entered name of the sending party fails to match the previously stored name.

* * * * *